W. J. SEAS.
AUTOMOBILE LIFTER.
APPLICATION FILED MAY 9, 1919.
1,341,620.
Patented May 25, 1920.
2 SHEETS—SHEET 1.
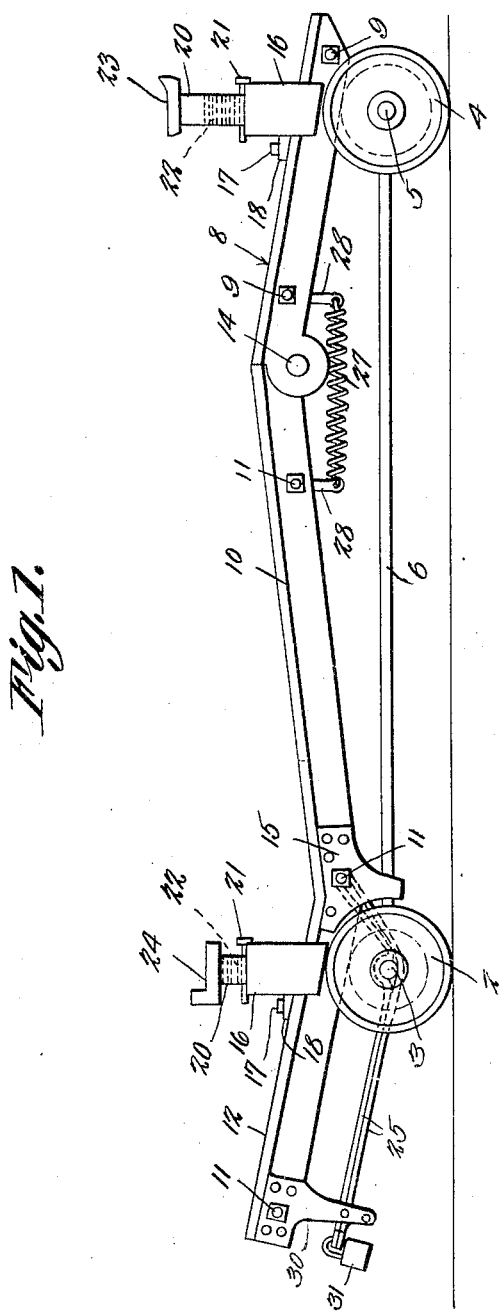
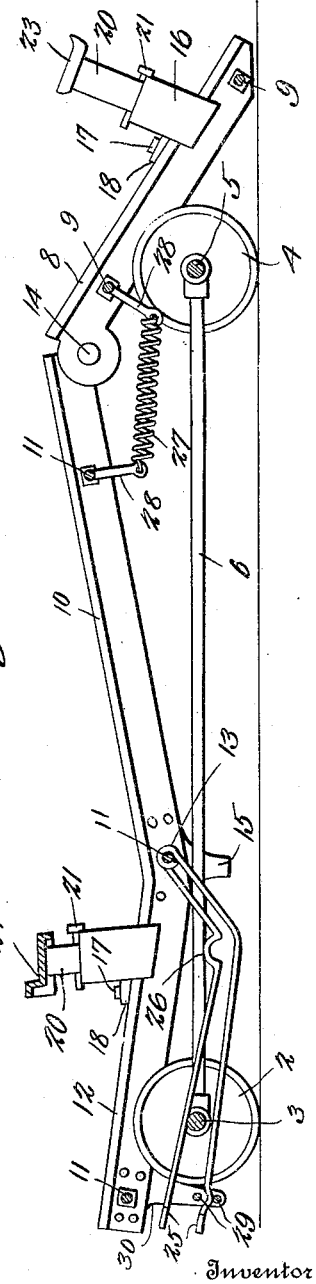
Inventor
William J. Seas,
By Henry J. Bruington.
Attorney

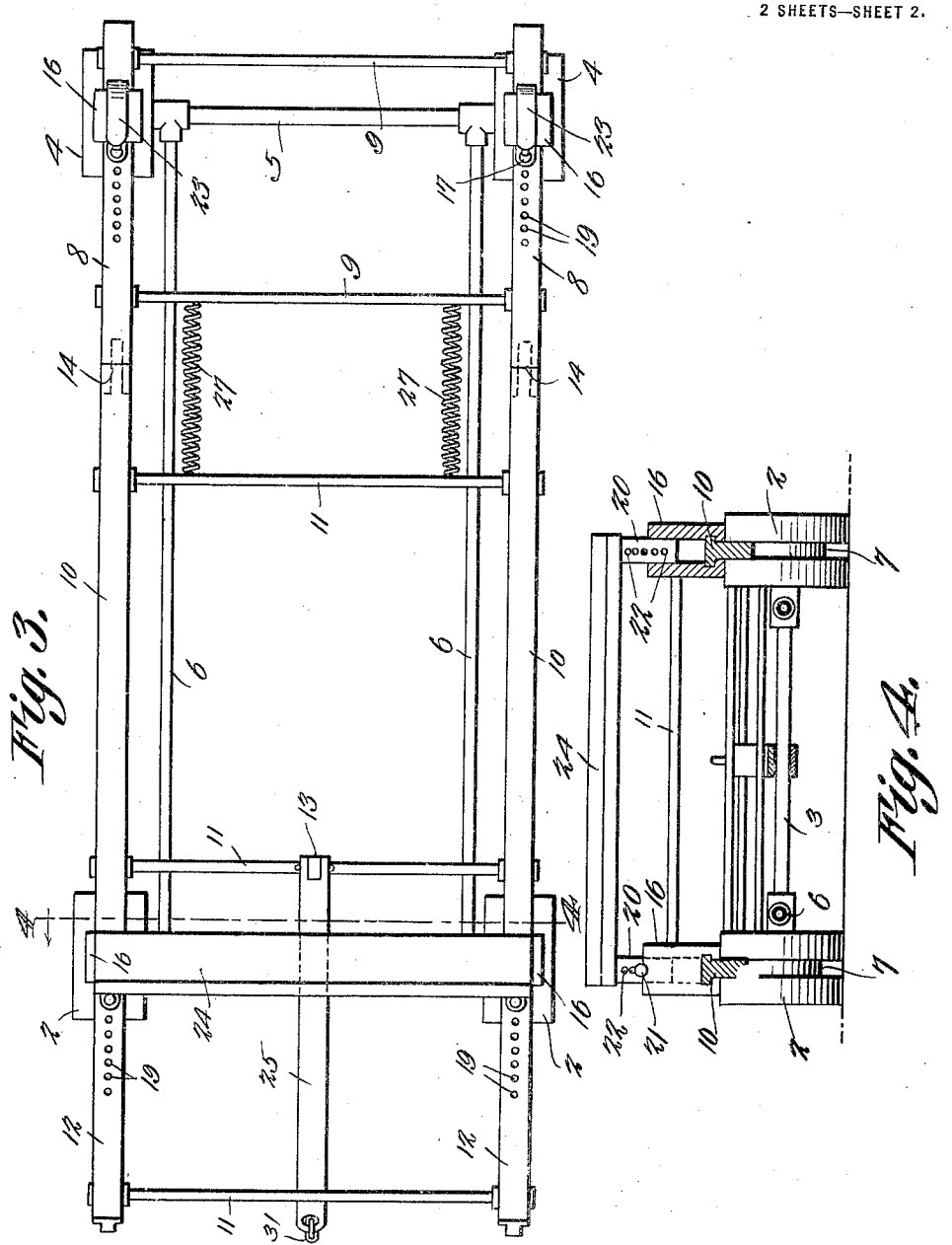

UNITED STATES PATENT OFFICE.

WILLIAM J. SEAS, OF BALTIMORE, MARYLAND, ASSIGNOR TO WILLIAM W. LEISTER, OF QUAKERTOWN, PENNSYLVANIA.

AUTOMOBILE-LIFTER.

1,341,620.     Specification of Letters Patent.     Patented May 25, 1920.

Application filed May 9, 1919. Serial No. 295,887.

*To all whom it may concern:*

Be it known that I, WILLIAM J. SEAS, a citizen of the United States, residing at Baltimore city, State of Maryland, have invented certain new and useful Improvements in Automobile-Lifters, of which the following is a specification.

This invention relates to improvements in lifters or jacks for vehicles, of that character wherein the vehicle is raised from the ground by the force of the impact of the vehicle when driven into position above the lifter, the object of the invention being to provide an improved device of this character which can be adjusted both as to length and height, which is automatic in its action, and simple in construction.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

Figure 1 is a side elevation showing the lifter in the position it will occupy when a car is thereon;

Fig. 2 is a longitudinal section through the lifter showing the same in the position it will occupy when ready to receive a car;

Fig. 3 is a plan view of the lifter; and

Fig. 4 is a cross section taken on the line 4—4 of Fig. 3.

The same characters of reference designate the same parts in the different figures of the drawings.

Referring to the drawings, the lifter comprises a truck, which consists in the present instance of a pair of front wheels 2 mounted on an axle 3 and a pair of rear wheels 4 mounted on an axle 5, the front and rear axles being connected by a pair of longitudinally extending bars or rods 6. The wheels are all formed with a centrally located circumferential depression or groove 7 adapted to receive and coöperate with the side bars of the lifter frame in the manner hereinafter described. The frame is made up of two sections, a rear section formed of a pair of side bars 8 connected together by a pair of tie rods 9, and a front section also formed of a pair of side bars connected together by tie rods 11. The side bars of the front section are bent so as to form portions 10 and 12 at an angle to each other, while the side bars of the rear section are connected at their front ends to the rear ends of the side bars of the front section by a hinge 14 of similar construction to the ordinary rule joint, the connecting ends of the sections being so formed that the side bars of the rear section are at an angle to the rear portions 10 of the side bars of the front section, the continuous upper surface of the side bars thereby forming alternately inclined portions; that is to say, the rear section will be inclined upwardly toward the rear portion of the front section and the latter inclined downwardly toward the portion 12, while this portion is inclined upwardly toward the front end of the structure. The side bars forming the sections are preferably of approximately T-shape in cross section, as shown clearly in Fig. 4, whereby the vertical portions of the bars will extend into the grooves 7 formed in the wheels and bear on the periphery of the concentric hubs forming the bottom wall of such grooves. A pair of hollow upright members 16 are mounted on the upwardly inclined portions at the front and rear of the structure, the lower ends of the members 16 being bifurcated to straddle the side bars and having lateral grooves formed in the side walls of the bifurcated portions to receive the horizontal portions of the T-shaped side bars. These bifurcated members are adjustably secured on the side bars by means of pins 17 passing through lugs 18 formed on the members 16, said pins being adapted to engage one of a series of openings 19, see Fig. 3, formed in the upper side of the horizontal portions of the side bars. In each of the members 16 is mounted a vertically adjustable post 20, which in the present instance is maintained in adjusted position by means of a pin 21 engaging one of a series of openings 22 passing through the post and resting at its ends on the upper end of the member 16. Each of the posts on the rear section is surmounted by a suitably formed seat 23 adapted to receive the rear axle of a car, while the posts on the front section are surmounted by an L-shaped cross bar 24 extending entirely across the frame from one post to the other. A pair of approximately parallel tongues 25 are hinged to the middle tie rod 11, at 13, each of said tongues being bent to form first a downwardly inclined portion and then an upwardly inclined portion extending toward the front of the structure. A pair of rods 29 extend across the front of the frame and are supported at their ends in the depending legs of a pair of brackets 30 secured one at each side of the frame, the end of the lower tongue passing between such rods whereby the tongue is prevented from swinging upwardly or downwardly. The front axle of the truck passes between the tongues and the upwardly inclined portion of the upper tongue is adapted to slidably engage said axle and is provided with a curved portion 26 forming a bearing for the axle at the point where the upwardly and downwardly inclined portions of the tongue intersect. A helical spring 27 may be secured to depending lugs 28 one secured adjacent to the front end of the rear section and one adjacent to the rear end of the front section at each side of the frame, the lugs being so located that the springs bridge the hinge connections between the two sections, whereby the tension of the springs will be exerted to assist in swinging the rear section on its hinge connections into open position.

The operation of the device is as follows: The front and rear members 16 are set sufficiently far apart to suit the length of the car that is to be raised, while the posts 20 are raised to the proper height to elevate the car when placed thereon. The lifter being then placed in the position shown in Fig. 2, the car is driven over the rear section and on over the rear portion of the front section until the front axle is directly over the horizontal portion of the cross bar 24. The momentum of the car will cause the front axle thereof to abut against the vertical portion of the cross bar 24 and will thereby carry the entire frame forward along with the car, the vertical portions of the T-shaped side bars 12 and 8 moving forward in the grooves of the wheels, while the upper tongue 25 rides over the front axle until the latter is engaged by the curved bearing 26, whereupon the frame no longer moves forward with relation to the truck. This operation has raised the front section by reason of the axle sliding along under the inclined surface of the tongue 25 until it has arrived directly below the front axle of the car. In the meantime the rear section of the frame has been carried forward over the rear wheels of the truck so that its center of gravity is considerably forward of the rear axle, which, together with the weight of the car on the frame will close the hinge connections between the rear and front sections, thereby causing the seats 23 to engage the underside of the rear axle of the car. Both the front and rear wheels of the car are thus raised from contact with the ground. The depending legs of the brackets 30 at the front of the frame serve to prevent the front wheels of the truck from passing out of contact with the side bars of the front section, while brackets 15 secured one at each side of the front section are also provided with similar depending legs to prevent the front wheels of the truck from accidentally getting past that point when the frame moves forward over the truck. When the car is in position on the frame the upper tongue 25 is swung downwardly into contact with the lower tongue and a padlock 31 passed through openings passing through the tongues near the ends thereof, whereby the device may be locked against unauthorized removal of the car therefrom. When it is desired to remove the car, the padlock is removed and the upper tongue swung upwardly so as to unseat the front axle of the truck from the bearing 26, whereupon the frame will slide backward until it arrives at the position shown in Fig. 2, in which position the wheels of the car are again in contact with the ground and the car can be backed off from the frame.

While I have described in detail the structure herein illustrated, it is to be understood that I do not thereby limit my invention to the precise features of construction shown, as I am aware that many mechanical changes and modifications may be made therein without departing from the spirit and scope of this invention as set forth in the claims hereto appended.

Having thus described my invention, what I claim is:

1. A device of the class described, comprising a portable truck provided with front and rear supporting wheels, and a frame mounted on said truck and having side bars formed of hingedly connected sections disposed in angular relation to each other, said side bars being adapted to engage the wheels of the truck thereby to cause movement of the frame with relation to said truck.

2. A device of the class described, comprising a portable truck provided with front and rear supporting wheels, a frame mounted on said truck and having side bars formed of hingedly connected sections disposed in angular relation to each other, said side bars being adapted to engage the wheels of the truck thereby to cause movement of the frame with relation to said truck, and means carried by said frame and adapted to engage the truck whereby forward movement of the frame will cause the same to be raised while rearward movement will cause it to be lowered.

3. A device of the class described, comprising a truck provided with front and rear wheels, a frame mounted on said truck and having side bars formed of a front section and a rear section, the rear section being hingedly secured to the front section and said sections being angularly disposed with relation to each other, the front section being also formed of portions disposed in angular relation to each other, the side bars of the sections being adapted to engage the wheels of the truck thereby to cause movement of the frame with relation to said truck.

4. A device of the class described, comprising a truck provided with front and rear wheels, all of said wheels being circumferentially grooved, a frame mounted on said truck and having side bars formed of a front section and a rear section, the rear section being hingedly secured to the front section, the organization being such that the continuous upper surface of the side bars form surfaces lying in alternately inclined planes, the side bars being adapted to engage the grooves of the wheels thereby to cause movement of the frame with relation to said truck, means carried by the frame and adapted to engage the truck whereby forward movement of the frame will cause the same to be raised while rearward movement will cause it to be lowered, means carried at the front and rear of the frame for supporting a vehicle, means for vertically adjusting both of said supporting means, means for varying the distance between the front and rear supporting means, and means for locking the frame against movement with relation to the truck.

5. A device of the class described, comprising a longitudinally movable lifting member having means for supporting an object to be elevated, a support for said member, and coacting means on the lifting member and the support for elevating and lowering the former when moved as aforesaid, said lifting member being composed of hingedly connected front and rear sections.

6. A device of the class described, comprising a longitudinally movable lifting member composed of hingedly connected front and rear sections having means for supporting corresponding portions of an object to be elevated, a support for said sections, and coacting means on the sections and the support for elevating and lowering the former when moved as aforesaid.

7. A device of the class described, comprising a longitudinally movable lifting member having means for supporting an object to be elevated, a support for said member, coacting means on the lifting member and the support for elevating and lowering the former when moved as aforesaid, a pair of pivoted locking bars carried by the lifting member, a cross member on the support straddled by the bars, and means for locking the bars to the cross member when the lifting member is in position to hold the object elevated.

In testimony whereof I affix my signature in the presence of two witnesses.

WILLIAM J. SEAS.

Witnesses:
E. WALTON BREWINGTON,
HOWARD D. ADAMS.